Oct. 29, 1963 S. POLANIECKI 3,109,082

ELECTRONIC CLOCK

Filed June 1, 1961

INVENTOR.
SALOMON POLANIECKI.
BY Alden D. Redfield
Irwin P. Garfinkle
ATTORNEYS.

United States Patent Office 3,109,082
Patented Oct. 29, 1963

3,109,082

ELECTRONIC CLOCK

Salomon Polaniecki, Cincinnati, Ohio, assignor to Avco Corporation, Cincinnati, Ohio, a corporation of Delaware Filed June 1, 1961, Ser. No. 114,127
13 Claims. (Cl. 219—20)

This invention relates to a miniaturized thermal servo system for producing a frequency standard of high accuracy and operational reliability, particularly adapted for single side band communications systems.

The design and development of certain single side band communications equipment imposed a requirement for a system reference generator or clock of high accuracy and reliability, miniaturization and low-power demand. The combination of novel circuitry and mechanical construction which satisfied these requirements includes a temperature-stabilized crystal-controlled oscillator, buffer amplifier, temperature sensor and regulator, all contained within a miniaturized sealed oven and uniquely supplied with a regulated voltage. A 7 megacycle embodiment of this invention actually reduced to practice utilized a Dewar container which was imbedded in aerogel foam within a rectangular can having dimensions ⅞ inch x ⅞ inch x 3 inches, and the unit was found satisfactory for secondary standards.

Briefly, this invention incorporates an oven temperature control comprising an electronic thermometer feeding a direct coupled D.-C. transistor amplifier to drive a variable resistor in the oven heater circuit. The particular D.-C. amplifier circuitry is of a regenerative nature in action such that the output of the regulator stage may be driven from cutoff to full conduction with a very small change in temperature. This feature allows regulation of temperature in the order of .01° C. This regenerative action is provided by means of diodes of a special transmission characteristic which are incorporated in the input circuits of the first and output stages of the heater control circuit. These diodes serve to regulate the flow of base currents as to direction and magnitude and may be treated in the analysis of the amplifier as voltage sensitive impedances of a character such that an increased voltage gives decreased impedance over an essentially linear operating range. In addition, the temperature characteristics of the diodes are used as a part of the amplifier compensation; that is, temperature increases near normal operating conditions tend to decrease the series resistance and hasten the amplifier saturation and the bridge input cutoff. A thermal switch or thermostat is designed to cut out at 5 to 7 degrees below the established operating oven temperatures. The frequency controlled oscillator circuit is a transistorized Pierce oscillator having all R-C components. A varactor in the base of the transistor is used as one element of a capacitive divider to establish and regulate the base A.-C. bias of the oscillating transistor. The D.-C. potential on the varactor is manually adjusted by means of a potentiometer to tune the oscillator exactly on frequency. This variable control is provided for minor adjustments which may be needed due to long-time drift or aging characteristics of the crystal in the Pierce oscillator.

The primary object of this invention is to provide a miniaturized frequency stable generator operating under electrical and mechanical conditions conducive to high reliability and long life.

Another object of this invention is to provide a miniaturized frequency standard housed in a miniaturized heat regulated oven.

Still another object of this invention is to contain an R-C oscillator in a temperature-regulated oven, the major components for regulating the temperature of the oven also being contained in the oven.

Another object of this invention is to provide a temperature-stable oven having extremely fast warm-up time and having reduced power requirements during steady-state operation.

Still another object of this invention is to provide a low-cost expendable generator capable of providing stable frequency operation over an extremely wide range of ambient temperatures.

Still another object of this invention is to uniquely contain and support the miniaturized elements of an R-C oscillator, a buffer amplifier, a temperature sensor, a temperature regulator, and a voltage regulator within a Dewar oven.

Still another object of this invention is to provide a regenerative amplifier employing components whose impedance decreases with increased voltage.

Another object of this invention is to provide a regenerative amplifier employing voltage-sensitive diodes having impedance characteristics such that an increased voltage results in a decreased impedance to provide very rapid amplification of small changes in voltage.

Still other objects of this invention are:

(1) A frequency stable clock operating under electrical and mechanical conditions conducive to extremely long reliable life;

(2) A miniature secondary standard;

(3) A unit reduced approxmately 500 percent in size over similar equipment;

(4) Warm-up time to stabilized frequency operation less than 5 minutes;

(5) Reduced power requirements in the order of three to one during warm-up and twenty to one in steady-state operation;

(6) A low-cost expendable unit suitable for that type of maintenance.

For further objects and for better understanding of the nature of this invention, reference should now be made to the following specification and to the accompanying drawings in which.

Figure 1:
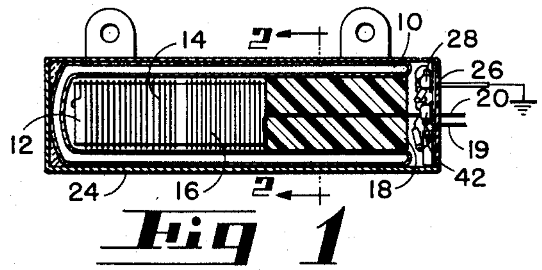
FIG. 1 is a partial cross-section of a complete assembly of this invention.
Figure 2:
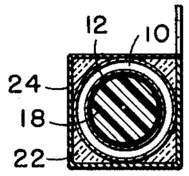
FIG. 2 is a cross-section taken through the line 2—2 of FIG. 1.

Referring first to FIGS. 1 to 4, there is shown a cylindrical Dewar container which constitutes an oven 10 in which is placed a cylindrical coil form 12. Oven-heating coils 14 and 16 are wound on the coil form, and the entire electronic assembly shown in FIGS. 3 and 4 and including a Pierce R-C oscillator, a buffer amplifier, a temperature sensor, and a regulator is contained within the coil form 12. The opening of the Dewar container or oven 10 is closed with an aerogel foam stopper 18 through which several circuit leads, including the output lead 19, the power supply lead 20, and the ground lead extend. The entire Dewar container is imbedded in aerogel foam 22 within a rectangular can 24 having an open end and which is hermetically closed by a header plate 26. The can 24 includes brackets 25 for suitably mounting the unit. The system voltage regulator is mounted on the plate 26.

Figure 3:
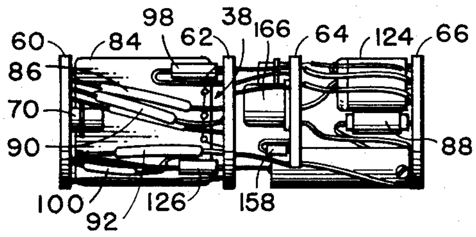
FIG. 3 is a top view of the assembly of the R-C oscillator, buffer amplifier, temperature sensor and temperature control circuits.
Figure 4:
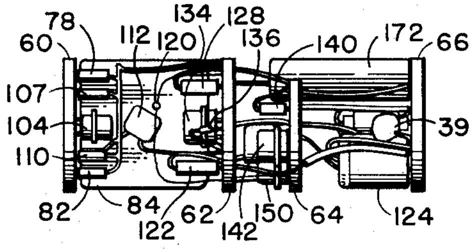
FIG. 4 is a bottom view of FIG. 3.
Figure 5:
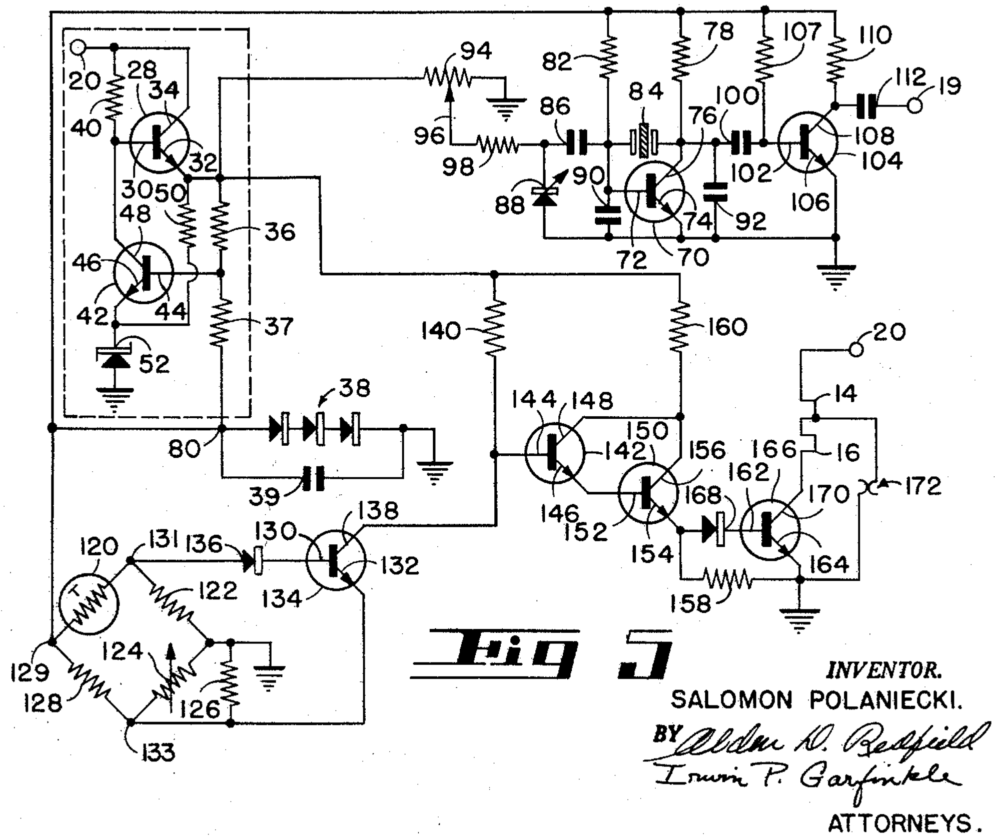
FIG. 5 is a circuit diagram of the electronic components.

The mechanical and electrical details of the construction of the electronic assembly is shown in FIGS. 3, 4, and 5 like reference characters referring to the same elements in the mechanical drawings and in the electronic schematic.

The voltage regulator comprises a transistor 28 having a base 30, an emitter 32, and a collector 34. The collector electrode is connected directly to the lead 20 and the emitter electrode is connected to ground through emitter-resistors 36 and 37 and three series-connected diodes 38 across which is connected a capacitor 39. The base electrode 30 is connected to the lead 20 through a resistor 40, and the lead 20 is connected to a direct current supply (not shown). A second transistor 42 having a base 44, an emitter 46, and a collector 48 is provided for stabilizing the voltage at the emitter 32 of transistor 28. For this purpose the base 44 of transistor 42 is connected to the junction of emitter-resistors 36 and 37, the collector 48 is connected directly to the base 30 of transistor 28. The emitter 46 is connected to the emitter 32 through a resistor 50, and is connected to ground through a zener diode 52.

The entire voltage regulator (except for the diodes 38) is shown within the dotted line in FIG. 5 and is mounted on the plate 26 which provides the hermetic closure for the can 24. The remaining components shown in FIG. 5 are all mounted within the heating coil form 12 inside the Dewar container 10. For mounting the various components there are provided four aligned circular insulated mounting disks or plates 60, 62, 64, 66 each having a diameter of a size approximately equal to the inside diameter of the coil form 12. As will be seen, the circular mounting plates are maintained in fixed spatial relationship without any special supporting elements but only by means of the wires interconnecting the various circuit components.

The mounting plate 60 supports the R-C oscillator and buffer amplifier. The R-C oscillator includes a transistor 70 having a base 72, an emitter 74, and a collector 76. The collector 76 is connected through a resistor 78 to a terminal 80 at the junction of resistor 37 and diodes 38 where a source of highly regulated direct currents is available. The base 72 is similarly connected to the terminal 80 through a resistor 82 while the emitter 74 is connected to ground. A piezoelectric resonator 84 is connected from the collector 76 to the base 72 while a capacitor 86 and a varactor 88 are connected in series between the base 72 and ground. A capacitor 90 is connected between the base 72 and ground, while the capacitor 92 is connected between the collector and ground. The frequency of oscillation is adjusted by varying the capacity of the varactor 88, and for this purpose a voltage is impressed across the potentiometer 94 from the emitter 32 of transistor 28 of the voltage regulator and applied to the varactor 88 through the movable tap 96 and a resistor 98.

The output from the oscillator is then applied through a coupling capacitor 100 to the base 102 of a buffer amplifier transistor 104 having an emitter 106 connected to ground and a collector 108 connected to the junction 80 through a resistor 110. Base bias is supplied through a resistor 107. The amplified oscillator output is derived through the capacitor 112 at the output lead 19.

The temperature-sensing circuit is mounted on the mounting plate 62 and it includes a temperature-sensitive resistor 120 connected in a bridge-type circuit including a fixed resistor 122, a variable resistor 124 and a fixed resistor 126 in parallel, and a fixed resistor 128, the regulated voltage supply being connected across the input diagonal of the bridge between the terminal 129 and ground. The voltage appearing across the other diagonal at terminals 131 and 133 of the bridge network is applied between the base 130 and the emitter 132 of a D.-C. transistor amplifier 134 through a diode 136. The collector 138 of transistor 134 is connected to the emitter of transistor 28 of the voltage regulator through a resistor 140. The potentiometer 124 is mounted on the plate 66.

An additional D.-C. amplifier for the output of transistor 134 is mounted on the mounting plate 64 and it includes a Darlington circuit including a transistor 142 having a base 144, an emitter 146, and a collector 148, and a transistor 150 having a base 152, an emitter 154, and a collector 156. The base 144 is driven by the output from transistor 134 while the collector 148 is connected directly to the collector 156 and the emitter 146 is connected directly to the base 152. The emitter 154 is connected to ground through an emitter-follower resistor 158 while the collector 156 is supplied through a resistor 160 connected to the emitter of transistor 28 in the voltage regulator. The emitter-follower output of transistor 150 is applied across the base 162 and emitter 164 of a D.-C. transistor amplifier 166 through a diode 168, the emitter 164 being connected to ground and the collector 170 being connected to the lead 20 through the heating coils 14 and 16 in series. A thermostat 172 mounted on the base 66, for a purpose hereinafter to be explained, is connected across the winding 16 and the collector 170 and emitter 164 in series.

It should be noted that the diodes 136 and 168 in the base circuits of the transistors 134 and 166 respectively are voltage sensitive devices whose impedance decreases linearly with applied voltage. In a typical case, an increase in voltage from approximately 0.44 volt to 0.63 volt produces a current which varies linearly from .01 milliampere to 1.3 milliamperes.

In the operation of the circuit described the lead 20 is connected to a source of unregulated direct voltage, the potentiometer 94 is adjusted to develop the desired operating frequency at the output terminal 19 and the potentiometer 124 is adjusted for the desired operating temperature of the oven. Initially when the oven is cool, the contacts of the thermostat 172 are closed, thereby short-circuiting the heating coil 16 and the collector and emitter junction of transistor 166. This has the effect of connecting the heating coil 14 directly across the power supply and thus rapid heating is produced to raise the temperature of the Dewar oven 10 to within approximately 5–7 degrees of the desired steady-state temperature. The contacts of the thermostat 172 then open placing both heating coils 14 and 16 in series with the collector-emitter junction of transistor 166 across the power supply, and normally the contacts of the thermostat 172 remain open during circuit operation.

The bridge network having been adjusted by means of the potentiometer 124, under steady-state conditions the voltage at the output terminals 131 and 133 is such that a predetermined current will flow through the heater coils 14 and 16 to supply the desired amount of heat for the Dewar oven 10. The temperature within the Dewar oven 10 between the mounting plates 60 and 62 is continuously measured by the thermistor 120, and any change in temperature is reflected by a change in voltage appearing at the bridge output terminals 131 and 133. This change in voltage is applied through the diode 136 to the base-emitter junction of transistor 134, and the amplified output of transistor 134 is further amplified in the Darlington circuit including the transistors 142 and 150. The emitter-follower output of the transistor 150 is then applied through the diode 168 to base-emitter junction of the output transistor 166 to provide an amplified variation in the current flowing through the heater coils 14 and 16.

The diodes 136 and 168 perform two useful functions in the environment of this circuit. First of all, the diodes 136 and 138 render the temperature-regulating amplifier regenerative in nature such that the output transistor 166 may be driven from cutoff to full conduction with a very small change in temperature. That is to say, with a small change in voltage across the terminals 131 and 133 of the bridge, the forward conductivity of the diode 136 is greatly enhanced, thereby providing a relatively large drive for the base-emitter junction of transistor 134. A similar effect is produced at the base-emitter junction of transistor 166 by means of the diode 168. This regenerative feature of the temperature-regulating amplifiers makes the system extremely sensitive, and in a practical embodiment, allowed regulation of temperature in the order of .01 degree C. In addition, the diodes 136 and 168 provide stable operation under varying temperature conditions for the reason that the current normally flowing through the diodes is in opposition to the $I_{co}$ currents flowing through the transistor, and hence any changes due to temperature variations in the $I_{co}$ currents of transistors 134 and 166 are opposed by the currents flowing through the diodes 136 and 168 respectively.

The power supply is provided with several stabilizing features. First, a stable voltage is produced at the emitter 46 of transistor 42 by means of the connection through the resistor 50 to the voltage regulating zener diode 52. In practice, the zener diode 52 operated at 5.6 volts. In addition, a very stable voltage is produced at the terminal 80 as a result of the three series-connected diodes 38. In practice, each of the diodes operated at .6 volt for a total of 1.8 volts. Operation of the transistor amplifier 28 is stabilized by means of the transistor 42, the base 44 of which is connected to the junction between resistors 36 and 37. Thus, any variation in voltage at the emitter 32, which acts as a variable resistor, is reflected at the base 44 of transistor 42, and this has the effect of changing the bias at base 30 to effect the necessary compensation. Thus the emitter 46 is maintained at a fixed potential by the zener diode 52. The terminal 80 is maintained at a fixed voltage by means of the three diodes 38, and any variations in voltage in the system are compensated by means of the negative feedback correction provided by the transistor 42.

The use of a Pierce oscillator having all R-C components provides an oscillator having good frequency stability characteristics and, in addition, permits miniaturization so that a low thermal mass is provided. The varactor 88 in the capacitive divider circuit in the base of the transistor 70 may be adjusted in capacity by means of a voltage adjustment provided by the potentiometer 94. Once the desired operating frequency is produced, the potentiometer 94 normally need not be readjusted except to compensate for changes due to aging of the components in the circuit.

Referring again to FIGS. 1–4, it will be noted that all of the electronic components, except for the power supply, are located in the closed end of the Dewar oven, and it will be recognized that the portion of the oven which is least affected by ambient temperatures is at that end. Because the closed end is the most stable in temperature, the oscillator and buffer-amplifier network are mounted on the plate 60 since this circuitry has the most critical temperature stability requirements. The temperature-sensing bridge and transistor 134 are mounted on the base 62, and the thermistor 120 is positioned at approximately the center of the heating coil 14. Thus the most critical components are positioned in the most stable area of the oven, that is, between the plates 60 and 62. The less critical apparatus, for example, the thermostat 172 and the potentiometer 194, are located on the plates 66 and 64 respectively.

In the construction of the apparatus, the leads interconnecting components on different plates are made relatively rigid, and since the components are miniaturized, sufficient rigidity of assembly of the electronic components is produced so that when inserted into the coil form 12, a sturdy assembly is provided.

Thus, there has been produced a system where the reduction of component thermal mass has made practical a relatively small oven demanding very low power for temperature maintenance. The use of R-C components contributed to the miniaturization, but more especially, to the frequency stabilization of the system.

In a circuit as actually reduced to practice, the following circuit parameters were used:

| | |
|---|---|
| Transistor 28 | Type 2N1613. |
| Transistor 48 | Type 2N1613. |
| Transistor **70** | Type 2N706. |
| Transistor 104 | Type 2N706. |
| Transistor 134 | Type 2N706. |
| Transistor 142 | Type 2N706. |
| Transistor 150 | Type 2N706. |
| Transistor 166 | Type 2N720. |
| Diodes 38 | Type SG22. |
| Diode 52 | 5.6 volts zener. |
| Diode 136 | Type SG22. |
| Diode 168 | Type SG22. |
| Resistor 36 | 1.2K ohms (−200 to −500 p.p.m./C.). |
| Resistor 37 | 390 ohms (zero temperature coefficient). |
| Resistor 40 | 2.2K ohms. |
| Resistor 50 | 12K ohms. |
| Resistor 78 | 5.6K ohms. |
| Resistor 82 | 100K ohms. |
| Resistor 94 | Variable to 10K ohms. |
| Resistor 98 | 100K ohms. |
| Resistor 107 | 10K ohms. |
| Resistor 110 | 220 ohms |
| Resistor 122 | 1.5K ohms. |
| Resistor 124 | Variable to 1K ohm. |
| Resistor 126 | 680 ohms. |
| Resistor 128 | 470 ohms. |
| Resistor 140 | 100K ohms. |
| Resistor 158 | 1.5K ohms. |
| Resistor 160 | 10K ohms. |
| Capacitor 39 | .002 $\mu$f. |
| Capacitor 86 | 22 $\mu\mu$f. |
| Capacitor 90 | 68 $\mu\mu$f. |
| Capacitor 92 | 22 $\mu\mu$f. |
| Capacitor 100 | 15 $\mu\mu$f. |
| Capacitor 112 | .001 $\mu$f. |
| Varactor 88 | Type PC–116–22. |
| Crystal 84 | Resonant at 7.0 megacycles. |
| Thermistor 120 | Type 32CH1. |

It is to be understood that the foregoing parameters are by way of illustration and are only for the purpose of better enabling persons skilled in the art to reconstruct the invention. It is apparent that many variations and adaptations of the circuitry and construction shown will be available to those skilled in the art without departing from the true scope of the invention, which is defined by the annexed claims.

What is claimed is:

1. In a miniaturized electronic frequency stable generator, the combination comprising: an oven comprised of a double-wall cylindrical container, said cylindrical container being closed at one end and open at the other end; a cylindrical coil form in said container at said closed end; heater coils mounted on said coil form; temperature-regulating circuitry for regulating the current through said heater coils; a plurality of substantially rigid axially aligned spaced disks of insulating material, the electronic components of said temperature-regulating circuitry and said frequency stable generator being supported on said disks within said coil form for regulating the current through said heating coils in response to temperature variations within said oven, the electronic leads between the components on different disks being relatively rigid and providing the sole support for securing said disks in fixed spatial relationship, said spaced disks defining a cylinder having substantially the same length and diameter as the inside diameter and length of said coil form and being inserted therein.

2. The invention as defined in Claim 1, and a metallic housing having an open end, said container being supported within said housing, a closure for said open end, said closure comprising a plate of insulating material; a power supply for said generator and said temperature regulating circuitry, said power supply being mounted on said plate within said housing.

3. The invention as defined in claim 1, wherein at least first and second heater coils are provided and wherein means are provided for by-passing said second heater coil and said temperature-regulating network until the temperature of said oven is within a predetermined range.

4. The invention as defined in claim 3 wherein said first heater coil is positioned adjacent said closed end of said container and wherein said generator and the temperature sensitive elements of said temperature-regulating network are positioned within the space surrounded by said first heater coil.

5. The invention as defined in claim 1 wherein said plurality of disks comprises first, second, third and fourth disks, and wherein said generator comprises a resistance capacitance oscillator mounted on said first disk, and wherein said temperature-regulating network includes temperature sensitive electronic components mounted on said second disk, and an amplifier for the output of said temperature-sensitive elements mounted on said third disk, and other electronic components which are relatively uncritical as to temperature variations mounted on said fourth disk, said first disk being positioned at said closed end of said container.

6. The invention as defined in claim 1 wherein said electronic circuitry comprises a 4-terminal bridge network including a heat-sensitive resistive element between two of said terminals and a potentiometer between another two of said terminals; a source of regulated voltage connected across one diagonal of said bridge network; an output circuit connected across the other diagonal of said bridge network, said output circuit including a semiconductor diode having characteristics such that its impedance decreases with increases in voltage, and a first transistor having base, emitter, and collector electrodes, said diode being connected in a series loop with the base-emitter junction of said transistor and said other diagonal; a second transistor having base, emitter, and collector electrodes; a second diode in series with the base-emitter junction of said second transistor, the collector of said first transistor being coupled to the base of said second transistor through a network including said diode, said heater coils being connected in series with the collector and emitter junction of said second transistor.

7. The invention as defined in claim 2 wherein said regulated power supply comprises: a first transistor having base, emitter, and collector electrodes; a first resistor; a zener diode; a series connection between a point of reference potential, said zener diode, said resistor, said emitter and collector, and a source of unregulated voltage, in the order named; a biasing resistor connected between said base and said source; second and third series-connected resistors and at least one voltage-regulating diode connected in series between said emitter and said point of reference potential; a second transistor having base, emitter, and collector electrodes, the base of said second transistor being connected to the junction of said second and third resistors, the collector of said second transistor being connected to the base of said first transistor, and the emitter of said second transistor being connected to the junction of said first resistor and said zener diode whereby a voltage of fixed potential is derived at the junction of said third resistor and said voltage-regulating diode.

8. The invention as defined in claim 7 wherein said generator and said temperature-regulating circuitry are supplied with regulated bias voltage from the emitter of said first transistor 9. In a system for maintaining the temperature of an oven constant, the combination comprising: heater coils for said oven; a source of regulated voltage; means for regulating the current flowing through said heater coils, said means comprising a first transistor having base, emitter, and collector electrodes, said heater coils being connected in series with the collector and emitter electrodes of said first transistor and said source; a temperature-sensing network in said oven for generating a direct voltage responsive to the temperature of said oven; a second transistor having base, emitter, and collector electrodes; a first diode coupling said voltage between said base and emitter electrodes; and a circuit coupling the collector electrode of said second transistor to the base electrode of said first transistor, said coupling circuit comprising a third transistor having base, emitter, and collector electrodes, a fourth transistor having base, emitter, and collector electrodes, and a second diode, the base electrode of said third transistor being connected to the collector electrode of said second transistor, the collector electrodes of said third and fourth transistors being interconnected, the emitter of said third transistor being connected to the base of said fourth transistor, and said diode being connected between said emitter electrode of said fourth transistor and the base of said first transistor; a regulated voltage source; a resistive connection between said regulated voltage source and the junction of the base of said third transistor and the collector of said second transistor, and a resistive connection between said regulated source and the junction of said collector electrodes of said third and fourth transistors.

10. The invention as defined in claim 9 wherein said heater coils comprise first and second coils and wherein a heat-sensitive switch is connected across one of said coils and the collector and emitter electrodes of said first transistor, said switch being in said oven and being closed until the temperature of said oven exceeds a predetermined value whereupon said switch opens.

11. A temperature-regulating network comprising a 4-terminal resistive bridge; a regulated direct current power supply connected across one diagonal of said bridge, an output circuit connected across the other diagonal of said bridge, said bridge including a resistance element having characteristics such that its resistance varies with variations in temperature and a potentiometer for initially adjusting the voltages developed across said other diagonals, said output circuit including a first transistor having base, emitter, and collector electrodes, and a first diode in series with the base-emitter junction of said transistor; a second transistor having base, emitter, and collector electrodes, first and second heater coils connected in series with the collector-emitter junction of said second transistor; a thermostat connected across said junction and one of said coils, said thermostat being closed until the temperature exceeds a predetermined value; and a circuit connected between the collector of said first transistor and the base of said second transistor, said circuit including a second diode, said first and second diodes having characteristics such that the impedance of each decreases as applied voltage increases.

12. In a system for maintaining the temperature of an oven constant, the combination comprising: heater coils for said oven; a source of unregulated voltage; means for regulating the current flowing through said heater coils, said means comprising a first transistor having base, emitter, and collector electrodes, said heater coils being connected in series with the collector and emitter electrodes of said first transistor and said source; a temperature-sensing network in said oven for generating a direct voltage responsive to the temperature of said oven; a second transistor having base, emitter, and collector electrodes; a first diode coupling said voltage between said base and emitter electrodes; and a circuit coupling the collector electrode of said second transistor to the base electrode of said first transistor, said coupling circuit comprising a second diode.

13. The invention as defined in claim 12 wherein said heater coils comprise first and second coils and wherein a heat-sensitive switch is connected across one of said coils and the collector and emitter electrodes of said first transistor, said switch being in said oven and being closed until the temperature of said oven exceeds a predetermined value whereupon said switch opens.

References Cited in the file of this patent

UNITED STATES PATENTS

| | | |
|---|---|---|
| 2,920,175 | Keen et al. | Jan. 5, 1960 |
| 2,973,420 | Craiglow et al. | Feb. 28, 1961 |
| 3,007,023 | Johnston et al. | Oct. 31, 1961 |
| 3,041,548 | Keen et al. | June 26, 1962 |